April 2, 1957 R. B. BUCHNER 2,787,661

CIRCUIT FOR USE IN AUTOMATIC SIGNALLING SYSTEMS

Filed July 22, 1952 3 Sheets-Sheet 1

INVENTOR
ROBERT BERTOLD BUCHNER
BY Fred M Vogel
AGENT

INVENTOR
ROBERT BERTOLD BUCHNER
BY Fred M Vogel
AGENT

April 2, 1957 R. B. BUCHNER 2,787,661

CIRCUIT FOR USE IN AUTOMATIC SIGNALLING SYSTEMS

Filed July 22, 1952 3 Sheets-Sheet 3

INVENTOR
ROBERT BERTOLD BUCHNER
BY Fred M Vogel
AGENT

United States Patent Office

2,787,661

Patented Apr. 2, 1957

2,787,661

CIRCUIT FOR USE IN AUTOMATIC SIGNALLING SYSTEMS

Robert Bertold Buchner, Hilversum, Netherlands, assignor, by mesne assignments, to North American Philips Company, Inc., New York, N. Y., a corporation of Delaware Application July 22, 1952, Serial No. 300,178

Claims priority, application Netherlands August 4, 1951

4 Claims. (Cl. 179—18)

Figure 1:
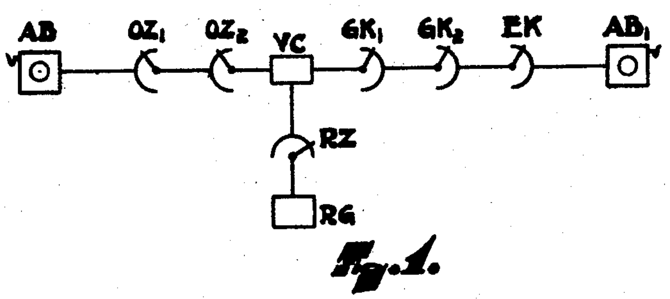

This invention relates to circuits for use in automatic signalling systems and comprising at least two stages of group selectors in cascade, of which the numerical adjustment is controlled by a register.

In automatic telephone circuits of known types used in exchanges comprising more than 1,000 connections, numerical connection between a connecting circuit and a subscriber's line is established by way of at least two stages of group selectors and one stage of final selectors, the outlets of the group selectors being connected to selectors of the subsequent stage. In setting-up numerical connections, the selectors are successively adjusted in cascade, the group selectors selecting a free outlet in conformity with a single digit of the number of the desired subscriber from the group giving access to the desired direction of trafic, the final selectors being adjusted in accordance with two digits. The number of selectors per selecting stage is determined by the maximum chance of stagnation which is permissible and which may be, for example, 0.002, i. e., the possibility that the equipment, due to busy conditions, is unable to complete a call is two out of a thousand calls.

The object of the present invention is to provide a circuit for use in such systems to obtain a material saving in selectors by the use of direct connections between outlets of selectors of several selecting stages. It is thus possible to route a comparatively large proportion of the connections outside determined selecting stages, so that the latter have to deal with only a comparatively low-density traffic.

Circuits are known for the connection of telephone exchanges in which use is made of overflow connections, in which case two exchanges are directly interconnected by lines through which traffic between the exchanges preferably takes place. If, however, all the direct lines are busy, additional traffic is routed through a third exchange. This step permits of economy of the direct lines, but does not provide any saving in selecting equipment.

Circuits are also known which utilise secondary line switches in order to increase the number of lines accessible by way of outlets of group selectors. In this case, a plurality of lines are connected directly to outlets of group selectors, other outlets thereof having connected to them inlets of secondary line switches which via their outlets give access to further lines. The outlets of the secondary line switches are not divided into numerical groups. This circuit also does not provide any saving in selectors.

According to the invention, a circuit for use in automatic signalling systems comprising at least two stages of group selectors in cascade, of which the numerical adjustment is controlled by a register, the selectors of the last group selecting stage and the outlets of the selectors concerned being divided into a plurality of numerical groups and the inlets of the selectors of the last group selecting stage being accessible by way of outlets of selectors of the first group selecting stage in the cascade, is characterised in that the outlets of selectors of the last group selecting stage are connected directly to outlets of selectors of the first group selecting stage. These connections are made in such manner that each group selector of the first group selecting stage has direct access to at least one outlet of each numerical group of outlets of all selectors of the last group selecting stage. The register establishes a numerical connection between the inlet of a selector of the first group selecting stage and a numerically desired outlet of the last group selecting stage, and if no such outlet is free, adjusts the selector of the first group selecting stage to a free outlet giving access to the desired numerical direction to which the inlet of a selector of the next-following group selecting stage in the cascade is connected.

Figure 2:
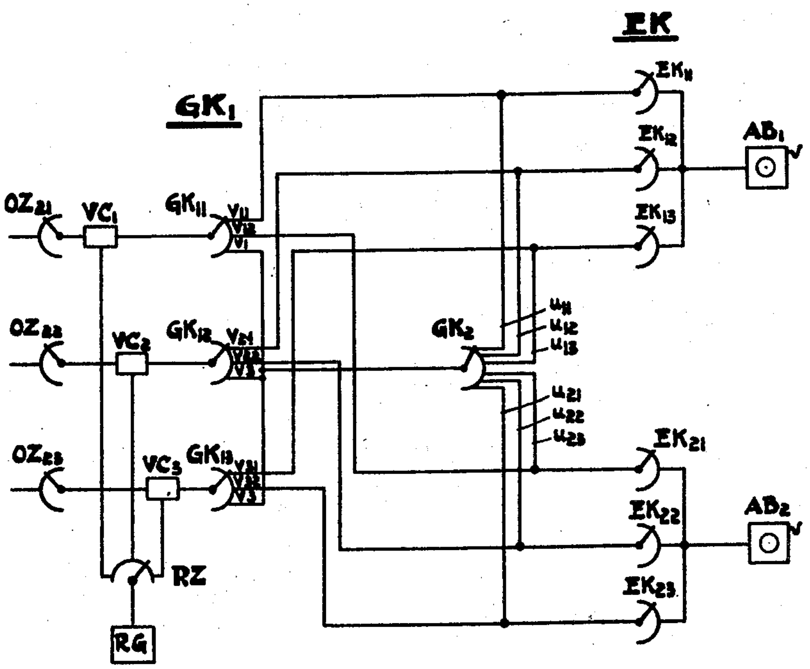
Figure 3:
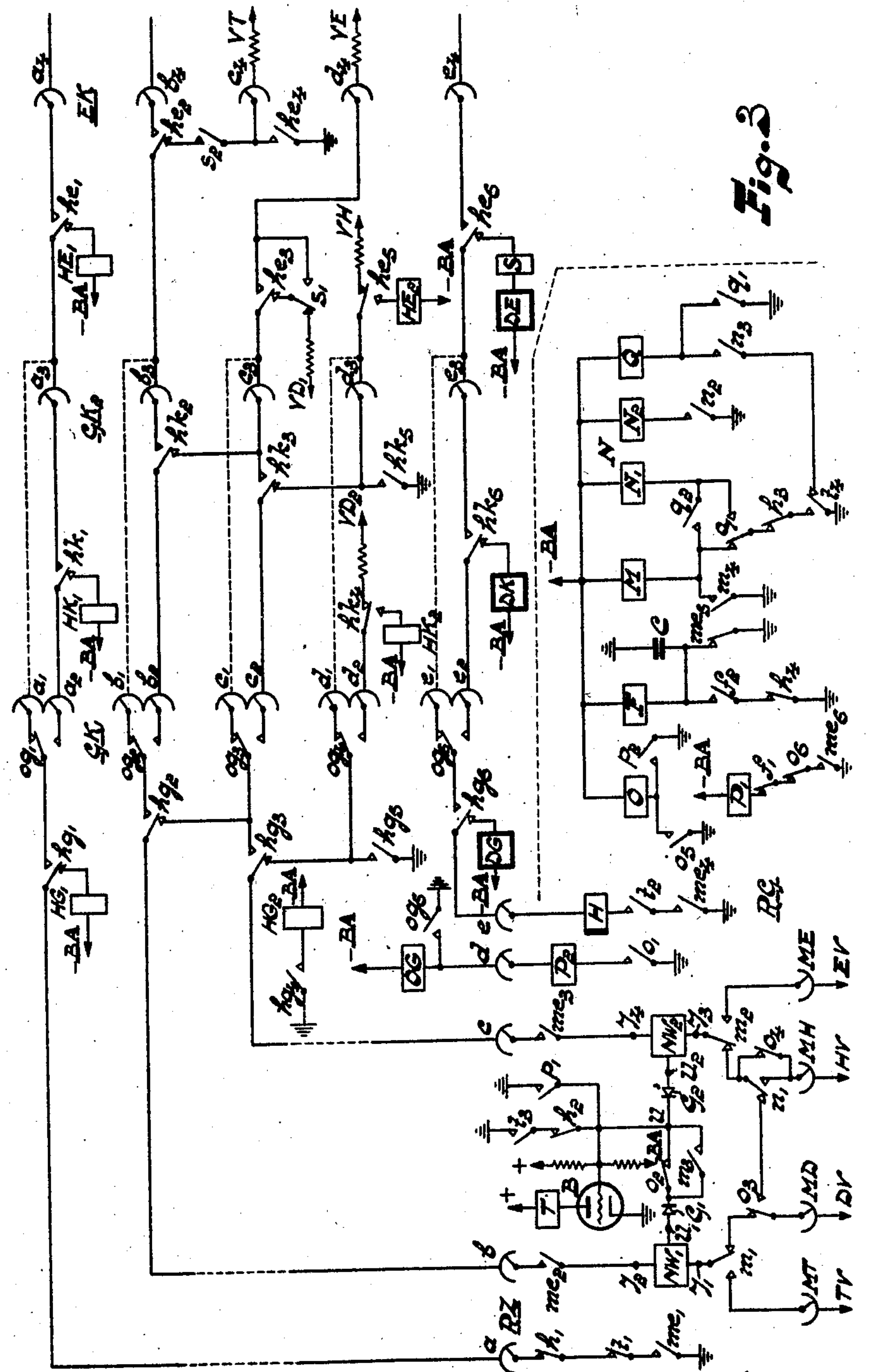
Figures 4, 5:
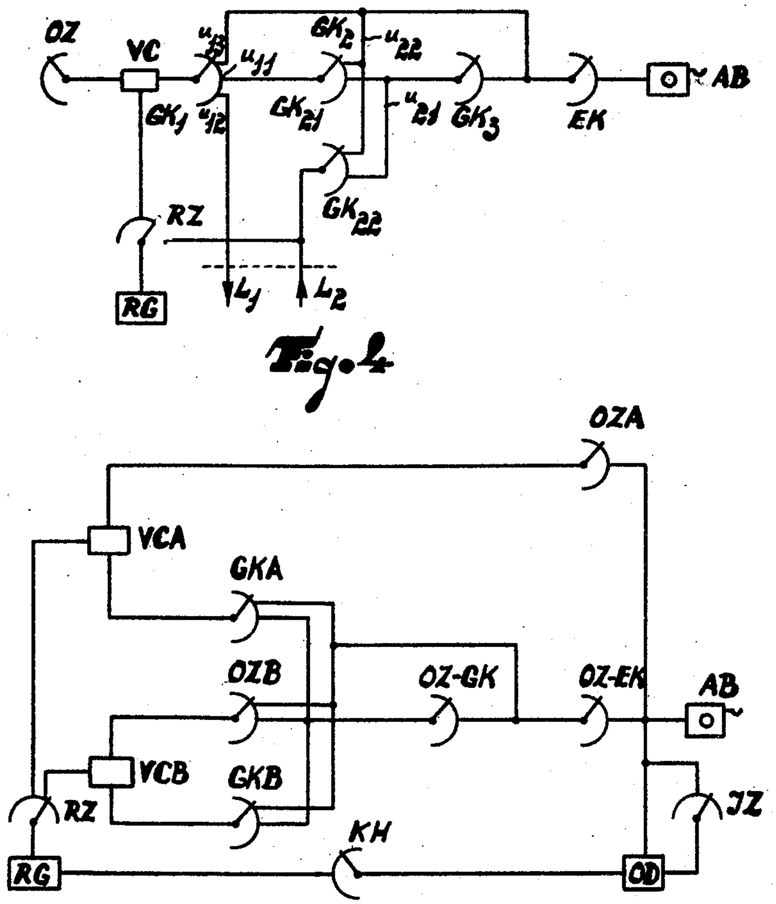

The invention will now be described with reference to the accompanying diagrammatic drawings, in which:

Fig. 1 illustrates a known method of establishing a connection between two subscribers, Fig. 2 shows a circuit according to the invention for use in an exchange comprising more than 1,000 connections, Fig. 3 is a circuit for controlling selectors such as may be used in the circuit shown in Fig. 2, Fig. 4 shows a circuit according to the invention for a system comprising a plurality of local exchanges, and Fig. 5 is a circuit for a telephone exchange comprising 9,000 connections, in which a circuit according to the invention is combined with line-finder saving circuits for further saving of dialling switches.

Fig. 1 shows a conventional circuit for connecting a subscriber AB to a subscriber $AB_1$ by way of an exchange of which the subscriber AB is connected to a free register RG by way of a first line finder $OZ_1$, a second line finder $OZ_2$, a connecting circuit VC and a register finder RZ. The numerical connecting path in accordance with the digits dialled by subscriber AB is set up under the control of the register RG by two stages of group selectors $GK_1$, and $GK_2$ and one stage of final selectors EK in cascade. The first group-selector $GK_1$, is adjusted in accordance with the first figure, the group selector $GK_1$ selecting a free second group selector $GK_2$ from the group having access to the direction desired. The adjustment of selector $GK_1$ may start upon reception of the first digit by the register RG. Similarly, the second group selector $GK_2$ is subsequently adjusted in accordance with the second digit, whereafter the final selector EK selects the desired line $AB_1$ in accordance with the last two digits of the number dialled.

If 4,000 lines are connected to the exchange, the numbers of switches $OZ_1$, $OZ_2$, $GK_1$, $GK_2$ and EK of the various stages and the number of connecting circuits VC are required to be 400, 184, 184, 192, 400 and 184, respectively, in order to deal with a mean incoming traffic of 3 Erl. per 100 subscribers with a possibility of stagnation per selecting stage smaller than 0.002. Consequently, the total number of switches required per 100 outlets is 1,360. Said numbers are under the same conditions 900, 414, 414, 594, 900 and 414, respectively, in an exchange for 9,000 subscribers, so that the total number of switches in the various connecting paths is 3222.

Fig. 2 shows two groups of final selectors EK, each associated with a group of 100 subscribers $AB_1$ and $AB_2$ respectively. In order to deal with an incoming traffic of 3 Erl. per 100 subscribers with a possibility of stagnation of 0.002 at the most, each group, similarly as in the circuit of Fig. 1, is required to comprise 10 final selectors. However, for the sake of simplicity, only three final selectors of each group are shown, viz., the final selectors $EK_{11}$, $EK_{12}$, $EK_{13}$ and $EK_{21}$, $EK_{22}$, $EK_{23}$ respectively. The inlets of the selectors are connected to outlets $U_{11}$, $U_{12}$, $U_{13}$, $U_{21}$, $U_{22}$, $U_{23}$ of second group selectors $GK_2$, of which the inlets are connected to outlets $V_1$, $V_2$, $V_3$ of first group selectors $GK_1$, the arrangement being similar to that of the circuit of Fig. 1. However, the inlets of the final selectors are furthermore connected directly to outlets $V_{11}$, $V_{12}$, $V_{21}$, $V_{22}$, $V_{31}$, $V_{32}$, etc. of the first group selectors $GK_1$ in such manner that one outlet of each first group selector directly has access to one final selector of each group of final selectors EK. For this purpose the first group selectors $GK_1$ are divided into a number of groups equal to the number of final selectors associated with each hundred subscribers, 10 groups in the case under consideration. Figure 2 shows three such groups of first group selectors $GK_1$, each group for the sake of simplicity being shown as a single selector $GK_{11}$, $GK_{12}$ and $GK_{13}$, respectively. A first final selector $EK_{11}$, $EK_{21}$, etc. of each group is connected directly to an outlet of the group of first group selectors $GK_{11}$, a second final selector $EK_{12}$, $EK_{22}$ of each group is connected to an outlet of a second group of first group selectors $GK_{12}$, a third final selector $EK_{13}$, $EK_{23}$ of each group is connected to an outlet of a third group of first group selectors $GK_{13}$, etc.

A calling subscriber is connected by way of a line finder $OZ_{21}$, $OZ_{22}$, $OZ_{23}$ and, if necessary, line finders of one or more further stages to a connecting circuit $VC_1$, $VC_2$ or $VC_3$, associated with one of the first group selectors $GK_1$, for example $GK_{11}$, whilst furthermore a register RG is connected by way of a register finder RZ to the said connecting circuit. The number of telephone connections, as before, is more than 1,000. The register stores the first digit until the second digit is received. At this moment it is determined to which group of 100 (group $AB_1$ or $AB_2$, etc.) the called subscriber belongs, so that it is also known via which group of final selectors the connection is required to be set up. Assume that the called subscriber is in group $AB_1$ connected to outlets of the final selectors $EK_{11}$, $EK_{12}$, $EK_{13}$, etc. The register first determines whether the final selector $EK_{11}$ of the desired group, connected directly to an outlet of $GK_{11}$, is free, in which event $GK_{11}$ is set to the outlet concerned, whereupon the final selector $EK_{11}$ is set in known manner to the called line. The setting of the first group selector $GK_{11}$ takes place in accordance with two figures, i. e. in a manner which is similar to that of a final selector.

In the case assumed, only one final selector of each group is connected directly to an outlet of a determined group of first group selectors. However, if a sufficient number of outlets of the first group selectors is available, it is possible to cause the first group selector to give access directly to two or more final selectors of a group, that is to say without the intermediary of a second group selector $GK_2$. In such a case, the first group selector $GK_1$ makes a free choice from the directly connected final selectors EK of the desired group.

If no such direct connection to a final selector EK is free, the first group selector $GK_{11}$ is set by the register in accordance with the first digit to a free second group selector $GK_2$, whereupon the latter is set normally in accordance with the second digit to a free final selector EK of the desired group.

For the first final selectors $EK_{11}$, $EK_{21}$, etc. of each group there is a preference to be engaged by way of one of the first group selectors $GK_{11}$, for the second final selectors $EK_{12}$, $EK_{22}$, etc. of each group there is a preference to be engaged by way of one of the first group selectors $GK_{12}$, etc. However, since for each final selector EK of a group there is a preference to be engaged by way of a definite different group of first group selectors $GK_1$, the number of connections to be dealt with is, on the average, equal for the various final selectors EK of a group, that is the probability of being free is the same for all final selectors EK of the group.

With an incoming traffic of 3 Erl. per 100 subscribers, on the average three final selectors EK are operative and hence 7 final selectors EK of the group of 10 are free. When a direct outlet to a final selector EK is tested by a first group selector $GK_1$, the probability of the said final selector being free is thus 70%. Consequently, on average 70% of the traffic is routed through direct connections between first group selectors $GK_1$ and final selectors EK. This traffic takes place without the intermediary of the second group selectors $GK_2$. The latter thus have to deal with only a comparatively small proportion of the total incoming traffic, viz. 30%, so that the number of second group selectors $GK_2$ may be much smaller than in a system as shown in Fig. 1. In determining the number of second group selectors $GK_2$ it is also germane that the possibility of stagnation of this stage may be assumed to be somewhat higher than normal, that is to say 0.002, since part of the traffic is routed through direct connections. The possibility of stagnation may now be 0.0066, which results in a further reduction in the number of second group selectors $GK_2$ required.

In an exchange for 4,000 subscribers, the subscribers are divided into 40 groups of 100 each. 40 of the 100 outlets of the first group selectors $GK_1$ are reserved for direct connections with final selectors EK, the other outlets, divided into four groups of 10 outlets, being accessible to four groups of second group selectors $GK_2$ and a group of 20 outlets being available for outgoing traffic. The total numbers of first group selectors $GK_1$ and final selectors in the exchange are in this case 184 and 400 respectively with an incoming traffic of 3 Erl. per 100 subscribers and a maximum possibility of stagnation of 0.002. The number of second group selectors is however 68, which is an economy of 124 selectors, relative to a system as shown in Fig. 1.

In an exchange for 9,000 subscribers, the subscribers are divided into 90 groups of 100. In this case, the number of outlets available on switches having 100 outlets is not sufficient to give each first group selector $GK_1$ directly access to a final selector EK of each group and also to second group selectors $GK_2$. In this case, the first group selectors $GK_1$ may advantageously be made in the form of switches having two hundred outlets, divided into two sets of 100 each, which groups cooperate with different sets of wipers. The 90 final selectors EK connected directly to a determined group of first group selectors $GK_1$, are then connected to the first set of 100 outlets, the second group selectors being connected to the second set of outlets, divided into 9 groups of 10, in accordance with the nine different directions of main traffic. The register RG first determines via wipers of the first set, whether the directly connected final selector EK of the desired group is free, switching-over the first group selector $GK_1$ to another set of wipers if the said final selector EK is busy.

The numbers of first group selectors $GK_1$ and final selectors EK required are, as before, equal to those required in a system as shown in Fig. 1, the number of second group selectors $GK_2$ being 153. Consequently, the number of dialling switches is in total 441 smaller. However, it is to be noted that in the system shown in Fig. 1, use may be made of first group selectors having 100 outlets, whereas in the circuit shown in Fig. 2 the first group selectors in comparatively large exchanges require 200 outlets, which switches are more expensive than those having 100 outlets. If switches having 200 outlets are 40% more expensive than those having 100 outlets, the 414 first group selectors $GK_1$ having 200 outlets are equivalent to 580 switches having 100 outlets, so that the effective gain in switches is only 275 and not 441.

Although the connection of a first group selector $GK_1$ directly to a final selector EK may fundamentally be effected by any known method, since it is substantially similar to that of a final selector, it is desirable that the selectors should be set with the use of marking and more particularly of selective marking. In this case, the outlets may be distributed numerically in any arbitrary manner over the contact bank, whilst it is furthermore possible for the selectors to be adjusted in accordance with two digits by a single movement and hence rapidly.

An example of a circuit for such control is shown diagrammatically in Fig. 3. The circuit comprises a register RG, which may be connected by way of a register finder RZ to a first group selector $GK_1$ and to a second group selector $GK_2$ and a final selector EK. The relays are indicated in the drawing by capital letters and the associated contacts by corresponding small letters. The selectors $GK_1$, $GK_2$ and EK each comprise a busy relay HG, HK, HE, respectively, each having two windings $HG_1$, $HG_2$, $HK_1$, $HK_2$, $HE_1$ and $HE_2$. The relays P and N in the register RG each has two windings $P_1$, $P_2$ and $N_1$, $N_2$. The first group selector $GK_1$ comprises 200 outlets and comprises two sets of outlet contacts $a_1$ $b_1$ $c_1$, $d_1$, $e_1$ and $a_2$, $b_2$, $c_2$, $d_2$, $e_2$, which cooperate with two different sets of wipers. It is possible to change-over from one set of wipers to the other with the use of change-over contacts $og_1$, $og_2$, $og_3$, $og_4$, $og_5$ of a switching relay OG.

The dialing switches are adjusted by means of direct-voltage comparison. The register RG comprises four marking switches MD, MH, MT, ME, which are adjusted in known manner which will not be described further here, in accordance with the thousands-, hundreds-, tens- and units-digits of the number of a called subscriber. The outlet contacts of the marking switches are connected to voltage sources DV, HV, TV, EV in such manner that the various contacts of each switch have different voltages applied to them. The values of the said voltages are representative of the different figures. Outlet marking contacts of the dialling switches are marked by direct voltages, the values of which are characteristic of the figure of the group with which the outlet is associated. A voltage source $VD_1$, which is connected by way of contacts $s_1$ and $he_3$ to marking contacts $c_1$ of selector $GK_1$, characterises the thousands digit of the outlet of selector $GK_1$ upon test of the final selectors EK connected directly to outlets of selector $GK_1$. A voltage source VH, which is connected by way of contact $he_5$ to marking contact $d_1$ of selector $GK_1$ and to marking contact $d_3$ of selector $GK_2$, characterises the hundreds digit of the outlets of selectors $GK_1$ and $GK_2$. Voltage source $VD_2$, which is connected by way of contact $hk_4$ to marking contact $d_2$ of selector $GK_1$, characterises the thousands digit of the outlet of selector $GK_1$ upon hunting for a free group selector $GK_2$ by selector $GK_1$. Voltage sources VT and VE characterise the tens- and the units-digits respectively of the lines connected to outlets of selector EK.

The register RG comprises two voltage comparison devices $NW_1$ and $NW_2$ (shown diagrammatically), which may be of known construction and which hereinafter will briefly be referred to as "zero switches," for comparing the comparative voltage selected by a marking switch with the numerical marking voltage of an outlet contact of a switch to be adjusted, which marking voltage is tested by the register RG via a wiper of the switch.

If the compared voltages at the inlet points $I_1$, $I_2$ and $I_3$, $I_4$ respectively of the zero switches are different, the outlet points $U_1$ and $U_2$ of the zero switches have comparatively high voltages, so that the rectifiers $G_1$ and $G_2$ are conductive and the voltage of point U is also comparatively high. A tube B is then conductive and test relay T included in its anode circuit is energized. If the voltages compared by a zero switch are equal, which implies that an outlet of the switch corresponding to the desired digit is reached, the zero switch decreases the voltage of its outlet point $U_1$, $U_2$ respectively, so that the associated rectifier is cut off. If contacts $o_2$ and $m_3$ are open, zero switch $NW_1$ is inoperative. If, now, zero switch $NW_2$ finds equality of voltage, the voltage of point $U_2$ and hence the voltage of point U decrease to such extent that tube B is cut off and relay T is de-energized. In the event of contact $o_2$ and/or contact $m_3$ being closed, the two zero switches must simultaneously find voltage equality to cause a decrease of the voltage of point U such that relay T may be de-energized, since if only one zero switch, for example $NW_1$, were to respond, the voltage of the outlet point $U_2$ of the other zero switch remains comparatively high, so that the voltage of point U also remains high and tube B is not cut off.

When the units digit is received, contacts $me_1$, $me_2$, $me_3$, $me_4$, $me_6$ are closed and contact $me_5$ opens, the contacts $me$ being associated with the marking switch ME. The relay T normally is energized. Due to contact $me_4$ being closed, rotary magnet DG of the first group selector $GK_1$ included in a circuit extending from earth via contacts $me_4$ and $t_2$, winding of relay H, wiper and marking contact $e$ of register finder RZ, contact $hg_6$ and the rotary magnet DG to the negative terminal of a batter BA (not shown), the positive terminal of which is connected to earth, is energized so that the group selector $GK_1$ is actuated for finding a directly connected final selector EK of the desired group. At the same time relay H in the said circuit is energized. The thousands-digit marking voltage $VD_1$ is now compared by the zero switch $NW_1$ via contacts $s_1$ and $he_3$, marking contacts $c_1$ and wiper of selector $GK_1$, contact $og_3$, contact $hg_2$, contacts and wiper $b$ of finder RZ, and contact $me_2$ with the comparative voltage DV, which is supplied by way of marking switch MD, contacts $o_3$ and $m_1$ to the inlet $I_1$ of zero switch $NW_1$. At the same time, the zero switch $NW_2$ tests by way of inlet point $I_4$, contact $me_3$, wiper and contact $c$ of register finder RZ and contacts $hg_3$ and $og_4$, the hundreds-digit marking voltage VH of the outlets of group selector $GK_1$, which is supplied by way of contact $he_5$ to marking contact $d_1$ of selector $GK_1$, by comparing the said voltage with the voltage HV, supplied by way of marking switch MH and contacts $o_4$ and $m_2$ to the inlet point $I_3$ of zero switch $NW_2$. During the hunting movement, the outlets are thus only tested via contacts of the first set of wipers $c_1$ and $d_1$. As mentioned before, the numerical marking voltage is removed from marking contacts of busy outlets, for example, due to the said contacts being connected to earth. If the directly selected final selector EK of the desired group is free, the zero switches $NW_1$ and $NW_2$ upon reaching this outlet respond simultaneously, so that test relay T is de-energized. Due to contact $t_2$ being opened, the circuit for energizing rotary magnet DG is interrupted, the selector $GK_1$ stopping on the outlet of the final selector EK. Contact $t_2$ opens the circuit for energizing relay H, so that this relay is de-energized a short time after relay T. Relay HG is energized by way of contact $me_1$ and the contacts $t_1$ and $h_1$, wiper and outlet contact $a$ of switch RZ, contact $hg_1$ and winding $HG_1$. Relay HG is held energized by way of its second winding $HG_2$ and contact $hg_4$, connecting the wiper $d_1$ of selector $GK_1$ through contact $hg_5$ and contact $og_4$ to earth, so that the hundreds-digit marking voltage VH is removed from the marking contact $d_1$ and the outlet is marked busy. Relay HG connects several control lines through to wipers of the switch $GK_1$ by way of its change-over contacts $hg_1$, $hg_2$, $hg_3$ and $hg_6$. When contacts $hg_2$ and $hg_3$ are opened, the numerical marking voltages of the inlet points $I_2$ and $I_4$ of the zero switches $NW_1$ and $NW_2$ are removed, so that relay T again energizes, followed after a short time by relay H. Contact $t_1$ opens the circuit for energizing relay HG by way of its first winding $HG_1$, before the contact $hg_1$ closes, so that the relay HE of the final selector cannot yet energize. Subsequently, relay M is energized by way of contacts $t_4$, $h_3$ and $o_7$. Relay M connects the inlet points $I_1$ and $I_3$ of the zero switches by way of its contacts $m_1$ and $m_2$ to the tens-digit marking switch MT and the units switch ME. Rotary magnet DE of the final selector EK is energized in a circuit from battery BA via the winding of DE, the winding of relay S, contact $he_6$, marking contact and wiper $e_1$ of selector $GK_1$, contact $og_5$, contact $hg_6$, contact and wiper $e$ of finder RZ, winding of relay H and contacts $t_2$ and $me_4$ to earth. In this circuit relay H in the register RG and relay S in the final selector EK are energized. The connection of point U by way of contacts $h_2$ and $t_3$ to earth prevents the relay T from being de-energized, either during or after switching-over the inlet points $I_1$ and $I_3$ of the zero switches to subsequent marking switches, before contact $h_2$ opens upon energisation of relay H.

During the movement of the final selector EK, the zero switch $NW_1$ tests the tens-digit marking voltage VT of the outlet of EK by comparing it with the comparative voltage TV adjusted by marking switch MT. The tens-digit marking voltage at marking contact $c_4$ of the final selector EK is supplied by way of contacts $s_2$ and $he_2$, marking contact and wiper $b_1$ of selector $GK_1$, contacts $og_2$ and $hg_2$, contact and wiper $b$ of finder RZ and contact $me_2$, to inlet point $I_2$ of zero switch $NW_1$. At the same time, zero switch $NW_2$ compares the units-digit marking voltage EV selected by marking switch ME with the units-digit marking voltage VE of the outlet marking contacts $d_4$ of final selector EK. The voltage VE is supplied by way of wiper $d_4$, contacts $s_1$ and $he_3$, marking contact and wiper $c_1$ of selector $GK_1$, contacts $og_3$ and $hg_3$, wiper and contact $c$ of finder RZ and contact $me_3$ to the inlet point $I_4$ of zero switch $NW_2$. As soon as the desired subscriber's line has been found, the two zero switches $NW_1$ and $NW_2$ respond and relay T is de-energized. Due to contact $t_2$ being opened, rotary magnet DE is de-energized and the selector EK stops and after a short delay relay H is de-energized. Relay HE is thus energized by way of contacts $me_1$, $t_1$ and $h_1$, wiper and contact $a$ of finder RZ, contacts $hg_1$ and $og_1$, wiper and marking contact $a_1$ of selector $GK_1$, contact $he_1$, and winding $HE_1$. Relay HE closes a holding circuit for itself through its second winding $HE_2$, contact $he_5$, marking contact and wiper $d_1$ of selector $GK_1$ and contacts $og_4$ and $hg_5$. The adjustment of the selection path is thus completed.

If the final selector EK of the desired numerical group, which is connected directly to selector $GK_1$ is busy, the zero switches $NW_1$ and $NW_2$ do not respond and the selector $GK_1$ continues to rotate. The register RG comprises a time-relay F, which is normally energized via contacts $h_4$ and $f_2$. Due to the response of relay H, the said energizing circuit is interrupted, but the relay F cannot be de-energized immediately since the said circuit is shunted by capacitor C, so that current flows for some further time through the winding of relay F. If switch $GK_1$ were to have found a free final selector EK within a certain time, the initial circuit for energizing relay F would again have been closed by way of contact $h_4$ upon de-energisation of relay H. The time of de-energisation of relay F is chosen to be such that switch $GK_1$ can pass all outlets at least once during this time. If the directly connected final selector EK is busy, selector $GK_1$ does not find a free outlet within the said time and the time-relay F is deenergized. Due to the de-energisation of relay F, the winding $P_1$ of relay P is energized by way of contacts $me_6$, $o_6$ and $f_1$. Relay P is energized and closes, by way of contact $p_2$, a circuit for energizing relay O, which is held energized via contact $o_5$. Due to the energisation of relay O, the energizing circuit of winding $P_1$ is opened at contact $o_6$, but relay P remains energized for some further time in a circuit extending via contact $o_1$, winding $P_2$ of relay P, wiper and contact $d$ of finder RZ, and the winding of a switch-over relay OG, which relay is energized in the said circuit. Relay OG closes a holding circuit for itself by way of contact $og_6$, short-circuiting at the same time the winding $P_2$ of relay P by way of contact $og_6$, so that relay P is deenergized. So long as relay P is energized, point U is connected to earth by way of contact $p_1$, which prevents relay T from being deenergized. Relay OG connects the group selector $GK_1$ by way of change-over contacts $og_1$, $og_2$, $og_3$, $og_4$ and $og_5$ to the other set of wipers. Due to contact $o_2$ being opened, the zero switch $NW_1$ is made inoperative. Contact $o_3$ connects, by way of contacts $n_1$ and $m_2$, the wiper of the thousands-digit marking switch MD to the inlet point $I_3$ of zero switch $NW_2$ and contact $o_4$ interrupts the connection between inlet point $I_3$ and the marking switch MH.

The group selectors $GK_1$ and $GK_2$ are adjusted in conformity with a single digit under the control of zero switch $NW_2$ only. After it has been found that a final selector EK is not directly available, the group selector $GK_1$ hunts for a free second group selector $GK_2$ in accordance with the selected thousands digit. Zero-switch $NW_2$ for this purpose tests the thousands digit marking voltage $VD_2$ of the outlet marking contacts $d_2$ by way of contacts $og_4$ and $hg_3$, contact and wiper $c$ of finder RZ and contact $me_3$, by comparing it with the thousands-digit marking voltage DV selected by switch MD. As soon as a free group selector $GK_2$ has been found, relays T and H are successively de-energized so that relay HG is energized by way of contacts $me_1$, $h_1$ and $t_1$ in the manner previously described. After relay T has again been energized, the winding $N_1$ of relay N is energized by way of contacts $t_4$, $h_3$ and $o_7$. Relay N is held energized by way of winding $N_2$ and contact $n_2$. Contact $n_1$ connects the hundreds marking switch MH by way of contact $m_2$ to inlet point $I_3$ and the connection of inlet point $I_3$ interrupts with switch MD.

Subsequently, after relay T has been energized, relay H is energized, in series with rotary magnet DK, via contact $hk_6$, marking contact and wiper $e_2$ of selector $GK_1$, contacts $og_5$ and $hg_6$, contact and wiper $e$ of finder RZ, winding of relay H and contacts $t_2$ and $me_4$. During the movement of selector $GK_2$, zero switch $NW_2$ tests the hundred-digit marking voltage VH of the outlet marking contacts $d_3$ of selector $GK_2$ by way of contact $hk_3$, marking contact and wiper $c_2$ of selector $GK_1$, contacts $og_3$ and $hg_3$, contact and wiper $c$ of finder RZ, and contact $me_3$. As soon as a final selector EK of the desired group has been found, the zero switch $NW_2$ responds and the relays T and H are successively de-energized. Due to the de-energisation of relay T, relay Q is energized in a circuit extending via contacts $t_4$ and $n_3$. Relay Q is held energized by way of contact $q_1$. Contact $t_2$ interrupts the circuit of rotary magnet DK, so that selector $GK_2$ stops. Relay HK is energized by way of winding $HK_1$, contact $hk_1$, contact and wiper $a_2$ of selector $GK_1$, contacts $og_1$ and $hg_1$, contact and wiper $a$ of finder RZ and contacts $h_1$, $t_1$ and $me_1$. Relay HK through-connects several control wires to wipers of the selector $GK_2$ by way of change-over contacts $hk_1$, $hk_2$ $hk_3$ and $hk_6$, closing by way of contact $hk_4$ a holding circuit for itself extending by way of contacts $hg_5$ and $og_4$, wiper and marking contact $d_2$ of selector $GK_1$, contact $hk_4$ and winding $HK_2$. Due to the closure of contact $hk_3$, the marking voltage is removed from the marking contact $d_3$ of selector $GK_2$, the outlet being marked busy. Zero-switch $NW_2$ reacts upon the opening of contact $hk_3$, increasing the voltage of its outlet point $U_2$, as a result of which relay T again responds and contact $t_1$ opens the circuit for energizing relay HK via its first winding. After relay T has been energized relay M is energized by way of contacts $t_4$, $h_3$ and $o_7$. Relay M is held energized by way of contact $m_4$, connecting by way of its contacts $m_1$ and $m_2$, the marking switches MT and ME to the inlet points $I_1$ and $I_3$ of zero switches $NW_1$ and $NW_2$. Due to the response of relay T, the relay H in the register RG and the relay S in the final selector EK are energized in series with rotary magnet DE. Subsequently, the final selector EK is adjusted to the desired numerical outlet, zero switch $NW_1$, of which the outlet point $U_1$ is now connected by way of rectifier $G_1$ and contact $m_3$ to the point U, testing the tens-digit marking voltage by way of contact $me_2$, wiper and contact $b$ of finder RZ, contacts $hg_2$ and $og_2$, wiper and marking contact $b_2$ of selector $GK_1$, contact $hk_2$, wiper and marking contact $b_3$ of selector $GK_2$ and contacts $he_2$ and $s_2$ to wiper $c_4$ of selector EK. Zero switch $NW_2$ at the same time tests the units-digit marking voltage VE of the marking contacts $d_4$ of selector EK by way of wiper and marking contact $c$ of finder RZ, contacts $hg_3$ and $og_3$, wiper and marking contact $c_2$ of selector $GK_1$, contact $hk_3$, wiper and marking contact $c_3$ of selector $GK_2$, contacts $he_3$ and $s_1$, and wiper $d_4$ of selector EK. When the desired outlet is reached, the two zero switches $NW_1$ and $NW_2$ response simultaneously, so that the circuit for energizing the rotary magnet DE is interrupted and selector EK stops. Relay HE is energized by way of contacts $me_1$, $t_1$ and $h_1$, wiper and contact $a$ of finder RZ, contacts $hg_1$ and $og_1$, wiper and contact $a_2$ of selector $GK_1$, contact $hk_1$, wiper and contact $a_3$ of selector $GK_2$, contact $he_1$ and winding $HE_1$. Relay HE closes a holding circuit for itself by way of contact $hk_3$, wiper and marking contact $d_3$ of selector $GK_2$, contact $he_5$ and winding $HE_2$. The adjustment of the selection path by way of the group selectors $GK_1$ and $GK_2$ and the final selector EK is thus completed.

Fig. 4 shows a writing diagram for a system for more than 10,000 subscribers, for example for 50,000 subscribers. The subscribers are connected in groups of 10,000 to 5 different exchanges and are characterized by a number consisting of five digits. The first digit determines the exchange with which a subscriber is associated, the four other digits indicating the thousands, hundreds, tens and units digits of the subscriber's number within the exchange. Figure 4 shows a cascade of four numerical selecting stages, a first group selector stage $GK_1$, a second group selector stage $GK_2$, a third group selector stage $GK_3$ and a final selector stage EK. Said selecting stages are provided in one of the exchanges. The other exchanges are similarly arranged.

Second group selectors $GK_{21}$ are connected to the outlets $u_{11}$ of the first group selectors $GK_1$. The outlets $u_{12}$ of selectors $GK_1$ give access to the other exchanges. The group selectors $GK_1$ which for this purpose are divided into groups in a manner similar to that described with reference to Fig. 2, each give direct access, via outlets $u_{13}$, to one final selector of each group of final selectors EK. The traffic from other exchanges is led via second group selectors $GK_{22}$. The outlets $u_{21}$ of the second group selectors $GK_{21}$ and $GK_{22}$ are connected to third group selectors $GK_3$. The second group selectors $GK_{21}$ and $GK_{22}$ also have direct access to a final selector EK of each group via outlets $u_{22}$. The second group selectors $GK_2$, similarly as the second group selectors $GK_1$, are divided into a number of groups equal to the number of final selectors EK per group. The second group selectors $GK_{21}$, which are connected to outlets of first group selectors $GK_1$, give direct access to final selectors EK other than those to which the first group selectors $GK_1$ have direct access.

A calling subscriber is connected to a register RG by way of one or more stages of line finders OZ, a connecting circuit VC and a register finder RZ. After the first digit has been received, it is determined to which exchange the called subscriber belongs. If it is found that a subscriber of another exchange is concerned, the register RG adjusts the group selector $GK_1$, in conformity with this digit, to a line $L_1$ leading to the exchange concerned. However, the register does not adjust of the first group selector $GK_1$ until the third digit is received, if the connection is to be established within the same exchange. At this moment it is determined through which group of final selectors EK the connection is to be set up. The register RG then first tests, in conformity with the second and the third digit, the final selector of the group concerned which is connected directly to selector $GK_1$. If this final selector EK is free, the register RG adjusts the selector $GK_1$ to it and subsequently the final selector EK in conformity with the last two digits. However, if the direct outlet is busy, the first group selector is adjusted to any free second group selector $GK_{21}$, whereafter the register RG again investigates with reference to the second and third digits whether the outlet $u_{22}$, which gives direct access to a final selector EK of the desired group, is free or busy. This is a final selector EK of the group other than that which has been tested via the first group selector $GK_1$. If the directly connected final selector is free, the second group selector $GK_{21}$ is adjusted thereto and the connection with the called subscriber is set up by way of the said final selector EK. If this final selector EK is busy, the register RG adjusts the second group selector $GK_{21}$ in conformity with the second digit, subsequently the third group selector in accordance with the third digit and finally the final selector EK.

Upon a call coming through a line $L_2$ from another exchange, the second group selector $GK_{22}$ is adjusted in a manner similar to that described above for the second group selector $GK_{21}$.

Since at first for each stage a direct connection to a final selector is tested, a considerable part of the traffic takes place without the intermediary of the second and/or third group selectors, so that the latter have to deal with a comparatively low traffic density and thus may be comparatively small in number.

The numbers of switches $GK_1$, $GK_{21}$, $GK_{22}$, $GK_3$ and EK per exchange are 610, 146, 224, 150 and 1,200, respectively, if it is assumed that a traffic of 4.2 Erl. per 100 lines comes in and that ⅓ of the traffic is led via outlets $u_{12}$ of selector $GK_1$ to other exchanges and ⅓ of the traffic flows back to the exchange by way of group selectors $GK_{22}$ and that the maximum possibility of stagnation per selecting stage is 0.002. Consequently, the total number of selectors per exchange is 2,330. Since the selectors $GK_1$, $GK_{21}$ and $GK_{22}$ have each 200 outlets, the equivalent value of all dialling switches of the exchanges together is 2,702 expressed in value relative to switches having 100 outlets. If no direct connections between the outlets of selectors $GK_1$ and of $GK_2$ and final selectors EK were used, the numbers of selectors $GK_1$, $GK_{21}$, $GK_{22}$, $GK_3$ and EK would be 610, 448, 224, 924 and 1,200 respectively and hence in total 3,406, in which event all switches require only 100 outlets.

Further modifications are possible in that the first group selectors, for example, may give direct access to third group selectors, whilst analogous principles may be used with systems having more than 100,000 subscribers, in which event the number of exchanges, each for 10,000 subscribers, is larger than 10. In the latter case, the subscriber lines are characterized by six figures, of which the first two figures indicate the exchange, it being possible for connections to be led through a cascade of five stages of selection, whereby one or more stages of selection in the numerical connection path may be passed by direct connections between stages of selection normally separated by intermediate stages. The circuits described permit of economy in selectors of intermediate stages of selection. Further economy in switches may be obtained by the use of line-finder saving circuits. An example of such a circuit for an exchange of 9,000 subscribers is shown in Fig. 5 in which two main groups of connecting circuits VCA and VCB are used, which may be connected by way of a register finder RZ to a register RG. The inlets of the connecting circuits VCA are accessible by way of a single stage of line-finders OZA to the subscriber lines AB. The inlets of the connecting circuits VCB may be connected by way of two stages of line finders OZB and OZ—EK or by way of three stages of line finders OZB, OZ—GK and OZ—EK to a calling line. The outlets of the connecting circuits VCA may be connected by way of two stages GKA and OZ—EK or by way of three stages GKA, OZ—GK and OZ—EK of numerical selectors to a calling line. Similarly, such a connection between the outlets of the connecting circuits VCB and a called line may extend via two stages GKB and OZ—EK or via three stages GKB, OZ—GK and OZ—EK of numerical selectors. Consequently, the switches OZ—GK and OZ—EK may be used either for connecting a calling line to a connecting circuit or for connecting a connecting circuit to a called line, in other words, the said switches may fulfil the function of either line finder or numerical selector. The adjustment of the line finders otherwise takes place in an exactly similar manner as that of selectors and this in both cases numerically in conformity with the number of a subscriber.

Nine groups of line finder-group selector switches OZ—GK are multipled to determined outlets of the switches GKA, GKB and OZB. The inlets of the line finder-final selector OZ—EK are multipled to outlets of the switches OZ—GK and are also each multipled to outlets of the switches GKA, OZB and GKB, so that each switch gives direct access to one line finder-final selector of each group. The number of line finder-final selectors OZ—EK per group is 10 with an assumed traffic of 3 Erl. per 100 lines and a chance of stagnation of 0.002. The switches GKA, GKB and OZB, similarly as in the circuit shown in Fig. 2, are divided into a number of groups equal to the number of line finder-final selector switches OZ—EK per group and hence, in this case, 10 groups.

Each group of 100 subscribers has associated with it a common call detector OD. Upon a call in the subscriber group concerned, the call detector OD responds, hunts and identifies the last two digits of the number of the calling subscriber for the subscriber's line by means of an identification finder IZ. Since each call detector OD is associated with a definite subscriber group, the thousands and hundreds digits of the subscriber's number are also identified. The call detector OD engages a free register RG by way of an auxiliary selector KH, transmitting thereto the subscriber's number.

Each group of subscribers has associated with it four connecting circuits VCA, which may reach the subscribers concerned by way of a single line finder OZA. The exchange thus comprises a total of 360 connecting circuits VCA with the associated line finders OZA and first group selectors GKA.

The register RG receives from the call detector OD a signal signifying whether a connecting circuit VCA associated with the group of the calling subscribers is free or busy and if free, engages it, whereafter the line finder OZA is adjusted to the calling line. If no connecting circuit VCA is free, the register RG engages any free connecting circuit VCB by way of the register finder RZ. Since there is a comparatively great possibility that a free connecting circuit VCA is available (80% with an incoming traffic of 3 Erl.) a considerable proportion, viz 80% of the incoming traffic is led through line finders OZA, so that only a small fraction, viz 20%, need be dealt with by the connecting circuits VCB. Consequently, the number of connecting circuits VCB and the associated switches OZB and GKB is only 68.

The register RG subsequently tests numerically in conformity with the first two digits of the number of the calling subscriber, whether the line finder-final selector OZ—EK of the desired group connected directly to an outlet of OZB is free. If such is the case, the line finder OZB is adjusted thereto, whereafter the finder selector OZ—EK is adjusted to the calling line. If the direct connection to the switch OZ—EK is busy, connection is established by way of the switches OZB, OZ—GK and OZ—EK in cascade. The switches are controlled wholly numerically, that is to say, as dialling switches, with reference to the digits of the subscriber's number that is to say, the switches OZB and OZ—GK in the manner of a group selector in conformity with the first and second digits, respectively, a free selection taking place from the group of outlets leading in the desired direction of traffic, whilst the line finder-final selector OZ—EK is adjusted in conformity with the last two digits in the manner of a final selector.

A connection between a connecting circuit VCA or VCB and a called subscriber is established with reference to the dialing signals received by the register RG in an exactly similar manner as the connection with a calling line. A considerable proportion of the connections is established without the intermediary of the switches OZ—GK and takes place via direct connections between the outlet of switches GKA, GKB or OZB and the line finder-final selectors OZ—EK. The total number of switches OZ—GK is 210.

Since the line finder connecting path between a connecting circuit and a calling line may be constituted by one switch (OZA), by two switches (OZB and OZ—EK), or by three switches (OZB, OZ—GK and OZ—EK) and the numerical selection path between a connecting circuit and a calling line may be constituted by two switches (GKA or GKB and OZ—EK) or by three switches (GKA or GKB, OZ—EK and OZ—GK), the speech connection between a calling subscribed and a called subscriber may comprise 3, 4, 5 or 6 switches. In the majority of cases, the line-finder path comprises only one switch and the selection path comprises only two switches so that the connection between the calling subscriber and the called subscriber takes place through only three switches. The probability of the connection comprising six switches is small. The fact that, under certain conditions, three stages of line finders in cascade may be used, implies that in principle, the connecting circuits VCB are accessible for all calling lines, so that the number of connecting circuits VCB may be smaller than if at the most two stages of line finders are available and hence not all of the connecting circuits VCB are accessible to all subscribers.

The total number of switches through which speech connections may take place is 1,966, whereas 3,222 switches would be required with a system similar to that shown in Fig. 1 under the similar conditions. Consequently, the number of switches is 1,256 smaller. However, it is to be noted that the switches GKA, GKB and OZB require 200 outlets each. Consequently, the value of the speech-path switches in the exchange is about equivalent to that of 2,165 switches having 100 outlets each, so that the effective gain is 1,057 switches. Expressed in switches of 100 outlets, the value of the speech-path switches with a system similar to that shown in Fig. 1, is 50% higher than with that of Fig. 5. Apart from the fact that the value of the switches is considerably smaller, it is to be considered that in a circuit as shown in Fig. 1 3,222 switches and in the circuit shown in Fig. 5 only 1,966 switches are in need of space and maintenance, so that there is also gain in the maintenance and space costs.

What I claim is:

1. A circuit for use in automatic signalling systems comprising at least two stages of group selectors in cascade, each of said selectors having an inlet and a plurality of outlets, the first of said stages comprising a plurality of selectors and the last of said stages comprising at least one selector, a register for controlling the numerical setting of said selector stages, the outlets of the selectors of the last of said group selecting stages being divided into a plurality of numerical groups, means for coupling the inlet of said selector of the last group selecting stage to an outlet of each of the selectors of the first group selecting stage, the groups of outlets of the last selector stage being numerically distinguished by at least two digits and the groups of the selectors of the last stage being numerically distinguished by the penultimate digit of the groups of outlets thereof, means interposed between the outlets of said selector of the last group selecting stage and the remaining outlets of selectors of the first selecting stage to provide direct connections, respectively, between said remaining outlets of each group selector of the first selecting stage and an outlet of each numerical group of outlets of the last group selecting stage, said register being adapted to provide a numerical connection between the inlet of a selector of said first group selecting stage and a numerically desired outlet of the last group selecting stage comprising means for setting the selector of the first group selecting stage to a free outlet connected directly to an outlet of the numerically desired group of the last group selecting stage, the selector of said first stage being controlled in correspondence with said at least two digits of the desired group of outlets, and means for setting the selector of the first group selecting stage in correspondence with the penultimate digit of the desired group of outlets to a free outlet thereof to which the inlet of a selector of the next following group selecting stage in the cascade is connected in the event no free outlet of said first stage connected directly to an outlet of the numerically desired group of the last group selecting stage is available.

2. A circuit as set forth in claim 1 wherein the selectors of the first group selecting stage are divided into a number of groups equal to the number of outlets per numerical group of outlets of the selectors of the last group selecting stage, the outlets of each numerical group of said outlets of the last group selecting stage being connected directly to outlets of different group selectors of the first group selecting stage.

3. A circuit as set forth in claim 2 further including a plurality of connecting circuits, a line finder second group selector, a line finder-final selector, a calling line and a called line and wherein the selectors of the first group selecting stage are divided corresponding to the outlets thereof into two main groups, each inlet of the selectors of one main group being connected to the inlet of one of said plurality of connecting circuits, each inlet of the selectors of the other main group being connected to the outlet of one of said connecting circuits, the outlets of the selectors of the one main group being multipled to corresponding outlets of selectors of the other main group and connected in one condition to an inlet of said line finder second group selector and in another condition to an inlet of a line finder-final selector of which the inlet is connected to an outlet of said line finder second group selector, an outlet of said line finder-final selector being connected to said called line, means for connecting one of said connecting circuits to said calling line in one condition via a selector of the one main group of the first group selecting stage and a line finder-final selector and in another condition via a selector of one main group of the first selecting stage, a line finder second group selector and a line finder-final selector, and means for connecting another one of said connecting circuits to said called line in one condition via a selector of the other main group of the first group selecting stage and a line finder-final selector and in another condition via a selector of the other main group, said line finder second group selector and a line finder-final selector.

4. A circuit as set forth in claim 3 further including a direct line finder, an inlet of one of said connecting circuits being connected to the inlet of said direct line finder, and the outlets of said direct line finder being connected to subscriber lines, whereby said last-mentioned connecting circuit may be connected to said calling line via said direct line finder.

References Cited in the file of this patent

UNITED STATES PATENTS

| | | |
|---|---|---|
| 2,305,779 | Hebel | Dec. 22, 1942 |
| 2,431,313 | Den Hertog | Nov. 25, 1947 |
| 2,431,692 | Hersey | Dec. 2, 1947 |
| 2,484,080 | Deakin | Oct. 11, 1949 |
| 2,529,166 | Lesigne | Nov. 7, 1950 |
| 2,629,019 | Lesigne | Feb. 17, 1953 |
| 2,642,499 | Gohorel | June 16, 1953 |